United States Patent
Takahashi et al.

(10) Patent No.: US 10,285,047 B2
(45) Date of Patent: May 7, 2019

(54) MOBILE STATION AND RADIO BASE STATION

(71) Applicant: NTT DOCOMO, INC., Tokyo (JP)

(72) Inventors: Hideaki Takahashi, Tokyo (JP); Hiromasa Umeda, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 15/022,965

(22) PCT Filed: Sep. 18, 2014

(86) PCT No.: PCT/JP2014/074694
§ 371 (c)(1),
(2) Date: Mar. 18, 2016

(87) PCT Pub. No.: WO2015/041293
PCT Pub. Date: Mar. 26, 2015

(65) Prior Publication Data
US 2016/0227399 A1  Aug. 4, 2016

(30) Foreign Application Priority Data
Sep. 20, 2013  (JP) .................... 2013-195820

(51) Int. Cl.
*H04W 8/24* (2009.01)
(52) U.S. Cl.
CPC ................... *H04W 8/24* (2013.01)
(58) Field of Classification Search
CPC ...................................... H04W 8/24
See application file for complete search history.

(56) References Cited

U.S. PATENT DOCUMENTS

| | | | |
|---|---|---|---|
| 2013/0095816 A1 | 4/2013 | Gerstenberger et al. | |
| 2013/0128816 A1 | 5/2013 | Li et al. | |
| 2014/0211750 A1* | 7/2014 | Larsson | H04L 5/0092 370/330 |
| 2015/0155930 A1* | 6/2015 | Liu | H04W 40/22 455/452.1 |

FOREIGN PATENT DOCUMENTS

| | | |
|---|---|---|
| CN | 102232312 A | 11/2011 |
| WO | 2012141634 A1 | 10/2012 |

OTHER PUBLICATIONS

International Search Report issued in corresponding application No. PCT/JP2014/074694 dated Dec. 16, 2014 (3 pages).

(Continued)

*Primary Examiner* — Mazda Sabouri
(74) *Attorney, Agent, or Firm* — Osha Liang LLP

(57) ABSTRACT

Even if "UE category" is notified of only in an uplink (or a downlink), a radio base station eNB can suitably perform a communication control on a mobile station UE in the downlink (or the uplink) for which "UE category" is not notified of. In the mobile station UE according to the present invention, when the mobile station UE does not support "UE category for Release-12" in the uplink, a transmitting unit 12 does not notify of "UE category for Release-12" corresponding to the uplink, and when the mobile station UE does not support "UE category for Release-12" in the downlink, the transmitting unit 12 does not notify of "UE category for Release-12" corresponding to the downlink.

1 Claim, 6 Drawing Sheets

(56) References Cited

OTHER PUBLICATIONS

Written Opinion of the International Searching Authority issued in corresponding application No. PCT/JP/2014/074694 dated Dec. 16, 2014 (5 pages).
Qualcomm Incorporated, "New UE categories"; 3GPP TSG-RAN meeting #61; RP-131162; Porto, Portugal, Sep. 3-6, 2013 (3 pages).
CMCC, "Discussion on UE category for 256QAM"; 3GPP TSG-RAN WG1 #76; R1-140592; Prague, Czech Republic, Feb. 10-14, 2014 (4 pages).
3GPP TS 36.306 V11.4.0, "3rd Generation Partnership Project; Technical Specification Group Radio Access Network; Evolved Universal Terrestrial Radio Access (E-UTRA); User Equipment (UE) radio access capabilities (Release 11)"; Sep. 2013 (27 pages).
3GPP TS 36.331 V11.5.0, "3rd Generation Partnership Project; Technical Specification Group Radio Access Network; Evolved Universal Terrestrial Radio Access (E-UTRA); Radio Resource Control (RRC); Protocol specification (Release 11)"; Sep. 2013 (347 pages).
Office Action issued in the counterpart Japanese Patent Application No. 2013-195820, dated Aug. 8, 2017 (7 pages).
Office Action issued in counterpart Japanese Patent Application No. 2013-195820, dated May 8, 2018 (6 Pages).
Office Action issued in counterpart Chinese Patent Application No. 201480051720.9, dated Sep. 28, 2018 (19 Pages).

* cited by examiner

FIG. 3

```
-- ASN1START
UE-EUTRA-Capability ::=        SEQUENCE {
   accessStratumRelease        AccessStratumRelease,
   ue-Category                 INTEGER (1..5),
   << skip unrelated part>>
}

UE-EUTRA-Capability-v1020-IEs ::= SEQUENCE {
   ue-Category-v1020           INTEGER (6..8)              OPTIONAL,
   << skip unrelated part>>
}

UE-EUTRA-Capability-v12xy-IEs ::= SEQUENCE {
   dl-ue-Category-v12xy        INTEGER (9..12)             OPTIONAL,
   ul-ue-Category-v12xy        INTEGER (9..12)             OPTIONAL,
   << skip unrelated part>>
}
```

FIG. 6

| UE Category | Maximum number of UL-SCH transport block bits transmitted within a TTI | Maximum number of bits of an UL-SCH transport block transmitted within a TTI | Support for 64QAM in UL | "use cases" |
|---|---|---|---|---|
| Category 1 | 5160 | 5160 | No | |
| Category 2 | 25456 | 25456 | No | |
| Category 3 | 51024 | 51024 | No | |
| Category 4 | 51024 | 51024 | No | |
| Category 5 | 75376 | 75376 | Yes | |
| Category 6 | 51024 | 51024 | No | |
| Category 7 | 102048 | 51024 | No | |
| Category 7a | 150752 | 75376 | Yes | "150Mbps"<br>• 2UL CA + 64QAM<br>• 1UL + 2 layer MIMO + 64QAM |
| Category 7b | 204096 | 51024 | No | "200Mbps"<br>• 2UL CA + 2 layer MIMO |
| Category 7c | 301504 | 75376 | Yes | "300Mbps"<br>• 2UL CA + 2 layer MIMO + 64QAM |
| Category 8 | 1497760 | 149776 | Yes | |

FIG. 7

| UE Category | Maximum number of DL-SCH transport block bits received within a TTI | Maximum number of bits of a DL-SCH transport block received within a TTI | Total number of soft channel bits | Maximum number of supported layers for spatial multiplexing in DL | Support for 256QAM in DL | "use cases" |
|---|---|---|---|---|---|---|
| Category 1 | 10296 | 10296 | 250368 | 1 | - | |
| Category 2 | 51024 | 51024 | 1237248 | 2 | - | |
| Category 3 | 102048 | 75376 | 1237248 | 2 | - | |
| Category 4 | 150752 | 75376 | 1827072 | 2 | - | |
| Category 5 | 299552 | 149776 | 3667200 | 4 | - | |
| Category 6 | 301504 | 149776 (4 layers) 75376 (2 layers) | 3654144 | 2 or 4 | - | |
| Category 7 | 301504 | 149776 (4 layers) 75376 (2 layers) | 3654144 | 2 or 4 | - | |
| Category 7a | 407360 | 203704 (4 layers) 101840 (2 layers) | 5481216 | 2 or 4 | Yes | "400Mbps"<br>• 1DL + 4 layer MIMO + 256QAM<br>• 2DL CA + 2 layer MIMO + 256QAM |
| Category 7b | 452256 | 149776 (4 layers) 75376 (2 layers) | 5481216 | 2 or 4 | No | "450Mbps"<br>• 2DL CA + 4 layer MIMO<br>• 3DL CA + 2 layer MIMO |
| Category 7c | 603008 | 149776 (4 layers) 75376 (2 layers) | 7308288 | 2 or 4 | No | "600Mbps"<br>• 2DL CA + 4 layer MIMO<br>• 4DL CA + 2 layer MIMO |
| Category 7d | 603008 | 203704 (4 layers) 101840 (2 layers) | 7308288 | 2 or 4 | Yes | "600Mbps"<br>• 2DL CA + 4 layer MIMO + 256QAM<br>• 3DL CA + 2 layer MIMO + 256QAM |
| Category 8 | 2998560 | 299856 | 35982720 | 8 | - | |

FIG. 8

```
-- ASN1START
UE-EUTRA-Capability ::=         SEQUENCE {
    accessStratumRelease        AccessStratumRelease,
    ue-Category                 INTEGER (1..5),
    << skip unrelated part>>
}

UE-EUTRA-Capability-v1020-IEs ::=  SEQUENCE {
    ue-Category-v1020              INTEGER (6..8)       OPTIONAL,
    << skip unrelated part>>
}
```

MOBILE STATION AND RADIO BASE STATION

TECHNICAL FIELD

The present invention relates to a mobile station and a radio base station.

BACKGROUND ART

In the LTE (Long Term Evolution) system, the number of processable bits per 1 TTI (Transmission Time Interval) (i.e., a peak throughput in a mobile station UE) in the mobile station UE is defined for every "UE category".

Currently, the specification formulation group of the LTE system has proposed to notify of, as shown in FIGS. 6 and 7, "UE category" that defines the peak throughput in a mobile station UE corresponding to an uplink and a downlink separately (refer to Non-Patent Document 1).

Moreover, in the existing LTE system, as shown in FIG. 8, the mobile station UE must notify of "UE category 1-5" defined in Release-8 of the LTE system as "UE category" that the mobile station UE itself is supporting.

On the other hand, with respect to "UE category 6-8" defined in Release-10 of the LTE system, in the existing LTE system, as shown in FIG. 8, the mobile station UE needs only notify of "UE category 6-8" as "UE category" that the mobile station UE itself is supporting only when the mobile station UE is supporting one of "UE category 6-8". That is, in the existing LTE system, when the mobile station UE supports "UE category 6/7", the mobile station UE notifies of "UE category 4" in addition to "UE category 6/7", and when the mobile station UE supports "UE category 8", the mobile station UE notifies of "UE category 5" in addition to "UE category 8".

PRIOR ART DOCUMENT

Non-Patent Document

Non-Patent Document 1: 3GPP Contribution RP-131162
Non-Patent Document 2: 3GPP TS36.306

SUMMARY OF THE INVENTION

In the existing LTE system, if "UE category 7a-7c" as defined in Release-12 of the LTE system has been notified of separately corresponding to an uplink and a downlink, a radio base station eNBs can perform a communication control on a mobile station UE based on "UE category 7a-7c" notified in the uplink and the downlink.

For example, when "UE category 7a" is notified of as "UE category" corresponding to the uplink and "UE category 7c" is notified of as "UE category" corresponding to the downlink, the radio base station eNB can perform a communication control based on "UE category 7a" on the mobile station UE in the uplink and perform a communication control based on "UE category 7c" on the mobile station UE in the downlink.

However, in the existing LTE system, if "UE category 7a-7c" is notified of only in the uplink (or the downlink), the radio base station eNB cannot determine how to perform the communication control on the mobile station UE in the downlink (or the uplink) for which "UE category 7a-7c" has not been notified of.

The present invention was made in view of the above discussion. It is an object of the present invention to provide a mobile station and a radio base station in which, even if "UE category" is notified of only in the uplink (or the downlink), the radio base station eNB can suitably perform a communication control on the mobile station UE in the downlink (or the uplink) for which "UE category" has not been notified of.

A first feature of the present invention is summarized as a mobile station includes a transmitting unit that notifies a radio access network of UE category that defines a peak throughput in the mobile station. The transmitting unit notifies of UE category for the third generation prescribed in the third generation of the LTE system for each of an uplink and a downlink in addition to notifying of UE category for the first generation prescribed in the first generation of the LTE system and UE category for the second generation prescribed in the second generation of the LTE system. When the mobile station does not support the UE category for the third generation in the uplink, the transmitting unit does not notify of the UE category for the third generation corresponding to the uplink, and when the mobile station does not support the UE category for the third generation in the downlink, the transmitting unit does not notify of the UE category for the third generation corresponding to the downlink.

A second feature of the present invention is summarized as a radio base station includes a receiving unit that receives from a mobile station UE category that defines a peak throughput in the mobile station; and a controlling unit that performs a communication control on the mobile station based on the received UE category. When the UE category received by the receiving unit does not include UE category for the third generation prescribed in the third generation of the LTE system corresponding to an uplink, the controlling unit performs the communication control on the mobile station in the uplink based on UE category for the first generation prescribed in the first generation of the LTE system or UE category for the second generation prescribed in the second generation of the LTE system, and when the UE category received by the receiving unit does not include the UE category for the third generation corresponding to a downlink, the controlling unit performs the communication control on the mobile station in the downlink based on the UE category for the first generation or the UE category for the second generation.

BRIEF DESCRIPTION OF DRAWINGS

FIG. 3 shows an example of a format of "UE-EUTRA-Capability" transmitted by the mobile station UE according to the first embodiment of the present invention.

FIG. 6 shows an example of parameters of UE category in an uplink.

FIG. 7 shows an example of parameters of UE category in a downlink.

FIG. 8 shows an example of a format of "UE-SUTRA-Capability".

DETAILED DESCRIPTION

Mobile Communication System According to First Embodiment of Present Invention

Referring now to FIGS. 1 to 5, a mobile communication system according to a first embodiment of the present invention is explained.

Figure 1:
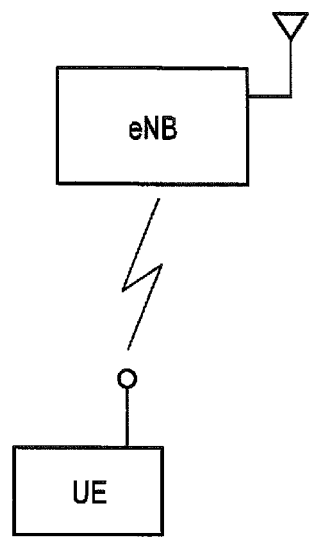
FIG. 1 is an overall structural diagram of a mobile communication system according to a first embodiment of the present invention.

As shown in FIG. 1, the mobile communication system according to the present embodiment supports Release-12 of the LTE system. The mobile communication system includes a radio base station eNB and a mobile station UE.

Figure 2:
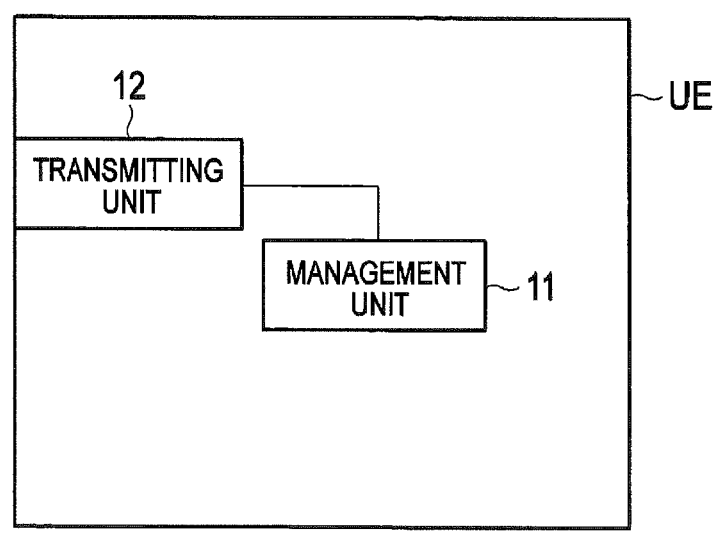
FIG. 2 is a functional block diagram of a mobile station UE according to the first embodiment of the present invention.

As shown in FIG. 2, the mobile station UE according to the present embodiment includes a management unit 11 and a transmitting unit 12.

The management unit 11 manages "UE category" supported by (corresponding to) the mobile station UE.

The transmitting unit 12 transmits various signals, e.g., "UE-EUTRA-Capability" (message) indicating "UE category" supported by the mobile station UE, to a radio access network (i.e., the radio base station eNB).

FIG. 3 shows an example of "UE-EUTRA-Capability". For example, the transmitting unit 12 notifies of "UE category 1-5 for Release-8" supported by the mobile station UE based on an information element "ue-Category" included in "UE-EUTRA-Capability" shown in the drawing, and notifies of "UE category 6-8 for Release-10" supported by the mobile station UE based on an information element "ue-Category-v1020" included in "UE-EUTRA-Capability".

The transmitting unit 12 inevitably notifies of "UE category 1-5 for Release-8" supported by the mobile station UE based on the information element "ue-Category" included in "UE-EUTRA-Capability".

On the other hand, the transmitting unit 12 notifies of "UE category 6-8 for Release-10" supported by the mobile station UE based on the information element "ue-Category-v1020" included in "UE-EUTRA-Capability" only when the mobile station UE supports one of "UE category 6-8 for Release-10".

That is, when the mobile station UE does not support "UE category for Release-10°", the transmitting unit 12 can be configured to not notify of "UE category for Release-10".

The transmitting unit 12 can notify of "UE category for Release-12 (e.g., "UE category 9-12")" supported by the mobile station UE in the downlink based on information element "dl-ue-Category-v12xy" included in "UE-EUTRA-Capability". Moreover, the transmitting unit 12 can notify of "UE category for Release-12 (e.g., "UE category 9-12")" supported by the mobile station UE in the uplink based on information element "ul-ue-Category-v12xy" included in "UE-EUTRA-Capability".

The transmitting unit 12 notifies of "UE category for Release-12" supported by the mobile station UE based on the information element "ul-ue-Category-v12xy" or "dl-ue-Category-v12xy" included in "UE-EUTRA-Capability" only when the mobile station UE supports one of "UE category for Release-12" in the uplink or the downlink.

That is, when the mobile station UE does not support "UE category for Release-12" in the uplink, the transmitting unit 12 does not notify of "UE category for Release-12" corresponding to the uplink. Moreover, when the mobile station UE does not support "UE category for Release-12" in the downlink, the transmitting unit 12 does not notify of "UE category for Release-12" corresponding to the downlink.

Figure 4:
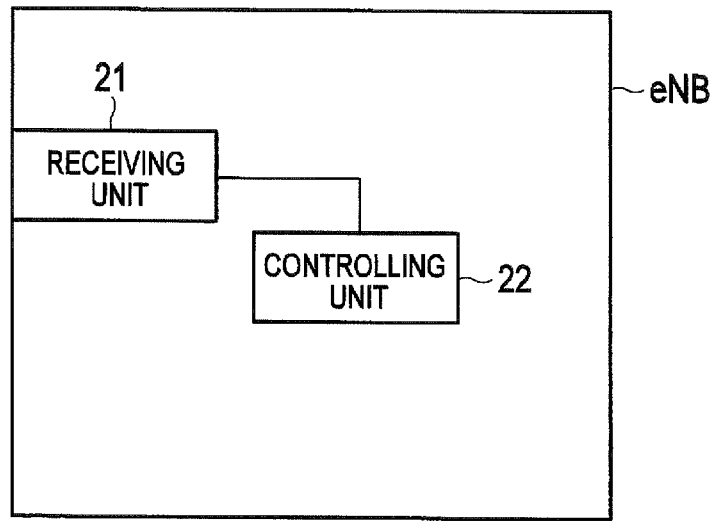
FIG. 4 is a functional block diagram of a radio base station eNB according to the first embodiment of the present invention.

As shown in FIG. 4, the radio base station eNB according to the present embodiment includes a receiving unit 21 and a controlling unit 22.

The receiving unit 21 receives from the mobile station UE various signals, e.g., "UE-EUTRA-Capability" indicating "UE category" supported by the mobile station UE.

The controlling unit 22 performs a communication control (e.g., a scheduling control) on the mobile station UE based on "UE category".

When "UE category for Release-12 (e.g., "UE category 9-12")" corresponding to the uplink is not received, i.e., when "UE-EUTRA-Capability" received by the receiving unit 21 does not include "UE category for Release-12" corresponding to the uplink, the controlling unit 22 performs the communication control on the mobile station UE in the uplink based on "UE category 1-5 for Release-8" or "UE category 6-8 for Release-10". Moreover, when "UE category for Release-12 (e.g., "UE category 9-12")" corresponding to the downlink is not received, i.e., when "UE-EUTRA-Capability" received by the receiving unit 21 does not include "UE category for Release-12" corresponding to the downlink, the controlling unit 22 performs the communication control on the mobile station UE in the downlink based on "UE category 1-5 for Release-8" or "UE category 6-8 for Release-10".

When "UE category 6-8 for Release-10" and "UE category for Release-12 (e.g., "UE category 9-12")" corresponding to the uplink are not received, the controlling unit 22 can be configured to perform the communication control on the mobile station UE in the uplink based on "UE category 1-5 for Release-8".

Moreover, when "UE category 6-8 for Release-10" and "UE category for Release-12 (e.g., "UE category 9-12")" corresponding to the downlink are not received, the controlling unit 22 can be configured to perform the communication control on the mobile station UE in the downlink based on "UE category 1-5 for Release-8".

For example, when "UE category for Release-12 (e.g., "UE category 10")" corresponding to the downlink is received, "UE category for Release-12 (e.g., "UE category 9-12")" corresponding to the uplink is not received, and "UE category 6 for Release-10" is received, the controlling unit 22 performs the communication control on the mobile station UE in the downlink based on "UE category 10", and performs the communication control on the mobile station UE in the uplink based on "UE category 6".

Figure 5:
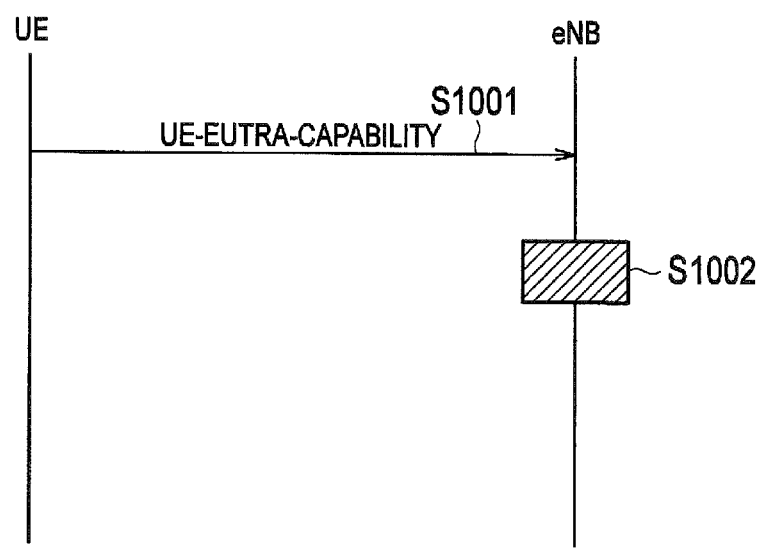
FIG. 5 is a sequence diagram of operations of the mobile communication system according to the first embodiment of the present invention.

Referring now to FIG. 5, operations of the mobile communication system according to the present embodiment is explained.

As shown in FIG. 5, at Step S1001, the mobile station UE transmits, to the radio base station eNB, "UE-EUTRA-Capability" including "UE category" supported by the mobile station UE.

At Step S1002, the radio base station eNB performs the communication control on the mobile station UE based on the information elements "ue-Category", "ue-Category-v1020", "dl-ue-Category-v12xy", and "ul-ue-Category-v12xy" included in the received "UE-EUTRA-Capability".

"UE category for Release-8" is "UE category" for the first generation prescribed in the first generation of the LTE system, "UE category for Release-10" is "UE category" for the second generation prescribed in the second generation of the LTE system, and "UE category for Release-12" is "UE category" for the third generation prescribed in the third generation of the LTE system.

The characteristic of the present embodiment explained above can be expressed as follows.

A first feature of the present embodiment is summarized as a mobile station UE includes a transmitting unit 12 that notifies a radio base station eNB (radio access network) of "UE category" that defines a peak throughput in the mobile station UE. The transmitting unit 12 notifies of "UE category for Release-12 (UE category for the third generation)" prescribed in Release-12 (the third generation of the LTE system) for each of an uplink and a downlink in addition to notifying of "UE category for Release-8 (UE category for the first generation)" prescribed in Release-8 of the LTE system (the first generation of the LTE system) and "UE category for Release-10 (UE category for the second generation)" prescribed in Release-10 (the second generation of the LTE system). When the mobile station UE does not support the "UE category for Release-12" in the uplink, the transmitting unit 12 does not notify of the "UE category for Release-12" corresponding to the uplink, and when the mobile station UE does not support the "UE category for Release-12" in the downlink, the transmitting unit does not notify of the "UE category for Release-12" corresponding to the downlink.

According to the feature, even if the "UE category for Release-12" is notified of only in the uplink (or the downlink), the radio base station eNB can suitably perform a communication control on the mobile station UE in the downlink (or the uplink) for which the "UE category for Release-12" is not notified of.

In the above first feature of the present embodiment, when the mobile station UE does not support the "UE category for Release-10", the transmitting unit 12 can be configured to not notify of the "UE category for Release-10".

According to the above feature, while maintaining consistency with the existing LTE system, even if the "UE category for Release-12" is notified of only in the uplink (or the downlink), the radio base station eNB can suitably perform the communication control on the mobile station UE in the downlink (or the uplink) for which the "UE category for Release-12" is not notified of.

A second feature of the present embodiment is summarized as a radio base station eNB includes a receiving unit 21 that receives from a mobile station UE "UE category" that defines a peak throughput in the mobile station; and a controlling unit 22 that performs a communication control on the mobile station UE based on the received "UE category". When the "UE category" received by the receiving unit 21 does not include "UE category for Release-12" corresponding to an uplink, the controlling unit 22 performs the communication control on the mobile station UE in the uplink based on "UE category for Release-8" or "UE category for Release-10", and when the "UE category" received by the receiving unit 21 does not include the "UE category for Release-12" corresponding to a downlink, the controlling unit 22 performs the communication control on the mobile station UE in the downlink based on the "UE category for Release-8" or the "UE category for Release-10".

According to the above feature, even if the "UE category for Release-12" is notified of only in the uplink (or the downlink), the radio base station eNB can suitably perform the communication control on the mobile station UE in the downlink (or the uplink) for which the "UE category for Release-12" is not notified of.

In the above feature of the present embodiment, when the "UE category" received by the receiving unit 21 does not include the "UE category for Release-10" and the "UE category for Release-12" corresponding to the uplink, the controlling unit 22 performs the communication control on the mobile station UE in the uplink based on the "US category for Release-8", and when the "UE category" received by the receiving unit 21 does not include the "UE category for Release-10" and the "UE category for Release-12" corresponding to the downlink, the controlling unit 22 performs the communication control on the mobile station UE in the downlink based on the "UE category for Release-8".

According to the above feature, while maintaining consistency with the existing LTE system, even if the "UE category for Release-12" is notified of only in the uplink (or the downlink), the radio base station eNB can suitably perform the communication control on the mobile station UE in the downlink (or the uplink) for which the "UE category for Release-12" is not notified of.

The operations of the mobile station UE and the radio base station eNB can be realized by hardware, can be realized by a software module executed by a processor, or can be realized by the combination of these.

The software module can be arranged in a storage medium having a desired form such as a RAM (Random Access Memory), a flash memory, a ROM (Read Only Memory), an EPROM (Erasable Programmable ROM), an EEPROM (Electronically Erasable and Programmable ROM), a register, a hard disk, a removable disk, and a CD-ROM.

The storage medium is connected to a processor so that the processor can read and write information from/in the storage medium. Alternatively, the storage medium can be integrated in a processor. Alternatively, the storage medium and the processor can be arranged in ASIC. The ASIC can be arranged in the mobile station UE and the radio base station eNB. Alternatively, the storage medium and the processor can be arranged as discrete components in the mobile station UE and the radio base station eNB.

The present invention has been explained in detail by using the above mentioned embodiments; however, it is obvious for a person skilled in the art that the present invention is not limited to the embodiments explained in the present description. The present invention can be implemented by way of modifications and changes without deviating from the gist and the range of the present invention specified by the claims. Accordingly, the indication of the present description aims at exemplary explanation, and has no intention to limit to the present invention.

The entire contents of Japanese Patent Application 2013-195820 (filed on Sep. 20, 2013) are incorporated in the description of the present application by reference.

INDUSTRIAL APPLICABILITY

As explained above, according to the present invention, a mobile station and a radio base station can be provided in which, even if "UE category 7a-7c" is notified of only in an uplink (or a downlink), the radio base station eNB can suitably perform a communication control on the mobile station UE in the downlink (or the uplink) for which "UE category 7a-7c" is not notified of.

EXPLANATION OF REFERENCE NUMERALS eNB Radio base station
UE Mobile station
11 Management unit
12 Transmitting unit
21 Receiving unit
22 Controlling unit

The invention claimed is:

1. A radio base station comprising:
a receiver that receives from a mobile station UE category that defines a peak throughput in the mobile station, the UE category included in UE-EUTRA-Capability; and
a processor that performs a communication control on the mobile station based on the received UE category, wherein
when the UE category received by the receiver includes a UE category for the third generation prescribed in the third generation of the LTE system corresponding to a downlink and does not include a UE category for the third generation corresponding to an uplink, the processor performs the communication control on the mobile station in the uplink based on UE category for the first generation prescribed in the first generation of the LTE system or UE category for the second generation prescribed in the second generation of the LTE system, and
when the UE category received by the receiver includes the UE category for the third generation corresponding to an uplink and does not include the UE category for the third generation corresponding to a downlink, the processor performs the communication control on the mobile station in the downlink based on the UE category for the first generation or the UE category for the second generation, and
the first generation is Release-8 of the LTE system, the second generation is Release-10 of the LTE system, and the third generation is Release-12 of the LTE system.

* * * * *